(12) United States Patent
Hänel

(10) Patent No.: US 8,463,425 B2
(45) Date of Patent: Jun. 11, 2013

(54) HIGH RACK WITH STORED GOODS SELECTION

(75) Inventor: Joachim Hänel, Bad Friedrichshall (DE)

(73) Assignee: Hänel & Co., Altstätten (CH)

( * ) Notice: Subject to any disclaimer, the term of this patent is extended or adjusted under 35 U.S.C. 154(b) by 373 days.

(21) Appl. No.: 12/307,028

(22) PCT Filed: Jul. 2, 2007

(86) PCT No.: PCT/EP2007/056653
§ 371 (c)(1),
(2), (4) Date: Jun. 26, 2009

(87) PCT Pub. No.: WO2008/003683
PCT Pub. Date: Jan. 10, 2008

(65) Prior Publication Data
US 2009/0312864 A1    Dec. 17, 2009

(30) Foreign Application Priority Data
Jul. 5, 2006   (DE) .......................... 10 2006 031 054

(51) Int. Cl.
*G06F 7/00* (2006.01)
(52) U.S. Cl.
USPC ............................. 700/215; 414/807; 700/216
(58) Field of Classification Search
USPC ................................................. 700/214, 215
See application file for complete search history.

(56) References Cited

U.S. PATENT DOCUMENTS

| | | | | |
|---|---|---|---|---|
| 5,771,003 | A | * | 6/1998 | Seymour ..................... 340/572.1 |
| 6,738,687 | B2 | * | 5/2004 | Hanel ............................ 700/214 |
| 2003/0147738 | A1 | * | 8/2003 | Hanel ............................ 414/807 |
| 2005/0067420 | A1 | * | 3/2005 | Diaz et al. ......................... 221/2 |
| 2005/0225749 | A1 | * | 10/2005 | Kong et al. ................... 356/218 |
| 2007/0142961 | A1 | * | 6/2007 | Bhasin et al. ................. 700/216 |
| 2008/0061071 | A1 | * | 3/2008 | Omura et al. ...................... 221/2 |

FOREIGN PATENT DOCUMENTS

| | | |
|---|---|---|
| DE | 297 06 328 U1 | 4/1997 |
| DE | 201 21 417 U1 | 3/2001 |
| DE | 10 2006 031 054.3 | 7/2006 |
| WO | WO 2008/003683 | 7/2007 |

OTHER PUBLICATIONS

International Search Report (PCT/EP2007/056653) (4 pages).

* cited by examiner

*Primary Examiner* — Gene Crawford
*Assistant Examiner* — Kyle Logan
(74) *Attorney, Agent, or Firm* — Brian B. Shaw, Esq.; Thomas B. Ryan; Harter Secrest & Emery LLP

(57) ABSTRACT

A storage rack with a multiplicity of stacked supports for supporting containers transferable by means of an automatic storage/retrieval device, featuring at least one access opening for storage/retrieval of containers and including a computer in which information as to the stored articles is saved, at least one digital camera being provided imaging the articles held in the containers and the digital image information being saved in the computer for display by means of a display means, has in addition assigned to a display means a pointer device by means of which the article to be retrieved is selectable from the digital image information.

19 Claims, 2 Drawing Sheets

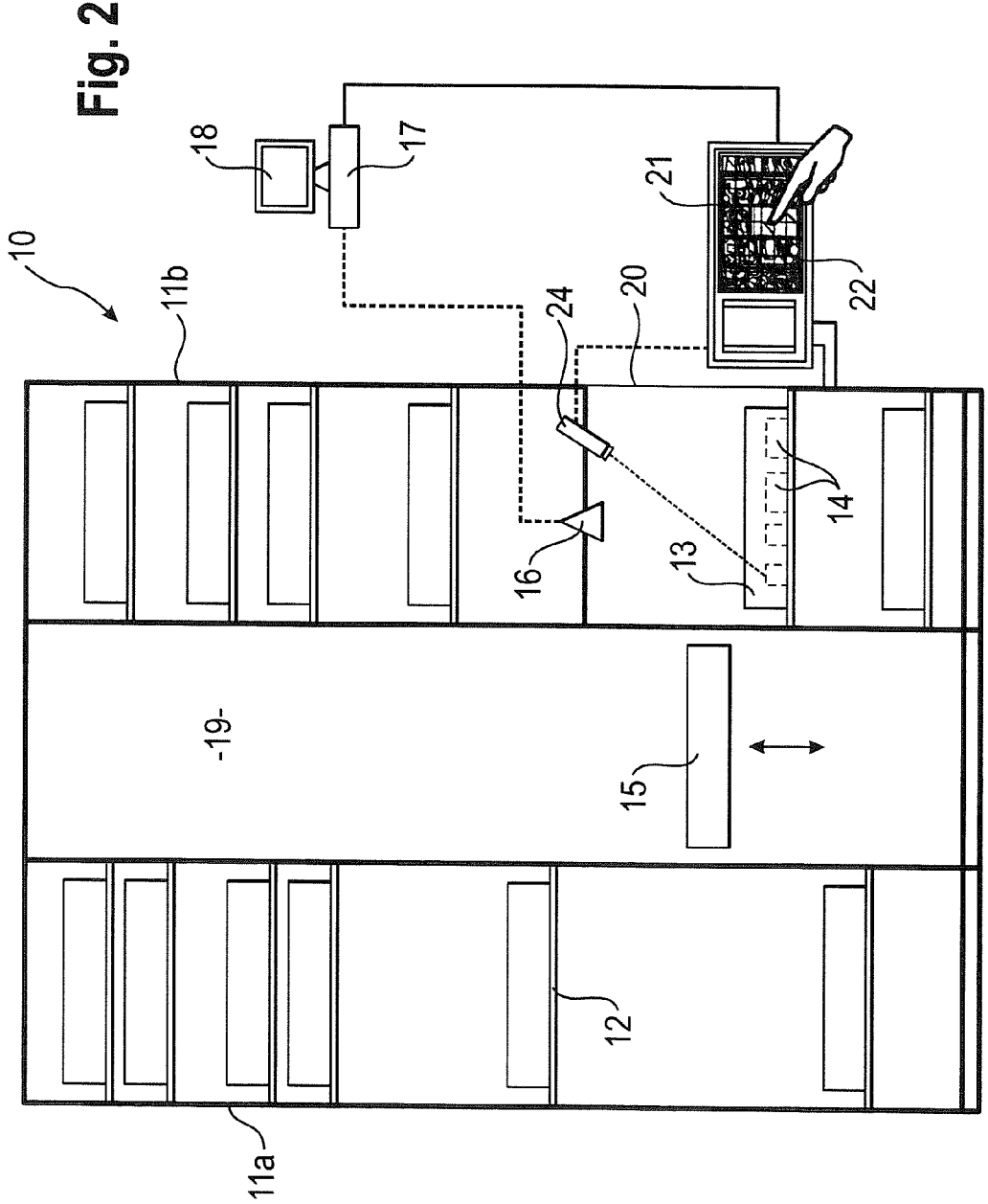

HIGH RACK WITH STORED GOODS SELECTION

CROSS-REFERENCE TO RELATED APPLICATIONS

This application is a national stage application and claims the priority of PCT/EP2007/056653 filed Jul. 2, 2007 which claims priority to German Application No. DE 10 2006 031 054.3 filed Jul. 5, 2006, herein incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to a storage rack with a multiplicity of stacked supports for supporting containers transferable by means of an automatic storage/retrieval device, featuring at least one access opening for storage/retrieval of containers and including a computer in which information as to the stored articles is saved, at least one digital camera being provided imaging the articles held in the containers and the digital image information being saved in the computer for display by means of a display means.

In such storage racks handling diverse kinds of storage articles it is known to capture the nature and quantity of the articles in the containers. It is likewise known to automatically capture the quantity of the articles by means of the weight.

2. Description of Related Art

DE 201 21 417 U1 teaches in addition how a storage rack features a digital camera which images the articles in the containers. The resulting information is then saved by means of a warehouse inventory program in the computer. The saved information can be displayed on a monitor.

BRIEF SUMMARY OF THE INVENTION

The invention is thus based on the object of proposing a storage rack of the aforementioned kind wherein selecting the articles to be retrieved is sophisticated.

To achieve this object it is proposed in accordance with the invention that the display means is assigned a pointer device by means of which the article to be retrieved is selectable from the digital image information.

In the storage rack in accordance with the invention the article to be retrieved is now selectable by intuitive pointing without the container needing to be retrieved. Likewise, it is now no longer necessary to select the wanted article from a list or similar abstract medium. Making such a direct selection is substantially more convenient than using digital or tabulated data.

Advantageous embodiments of the invention are described in the dependent claims.

Advantageously a computer mouse is provided as the pointing device. This is advantageous because selecting the article is then done by a device with which the operator is already familiar from other situations.

It is just as possible to advantage that the pointing device is devised together with the monitor as a touch screen. Thus, the need to make a separate pointing device available is eliminated which is especially an advantage when no suitable surface is available, for example, for operating a computer mouse.

In addition, an optical highlighting unit can be provided to advantage which highlights the selected article after the container has been transferred into the access opening.

BRIEF DESCRIPTION OF THE SEVERAL VIEWS OF THE DRAWINGS

Further features and advantages of the invention will now be detailed from the description of example embodiments with reference to the drawing in which:

FIG. 1 is a diagrammatic side view of a first embodiment of a storage rack in accordance with the invention and FIG. 2 is a diagrammatic side view of a second embodiment of a storage rack in accordance with the invention.

DETAILED DESCRIPTION OF THE INVENTION

Figure 1:
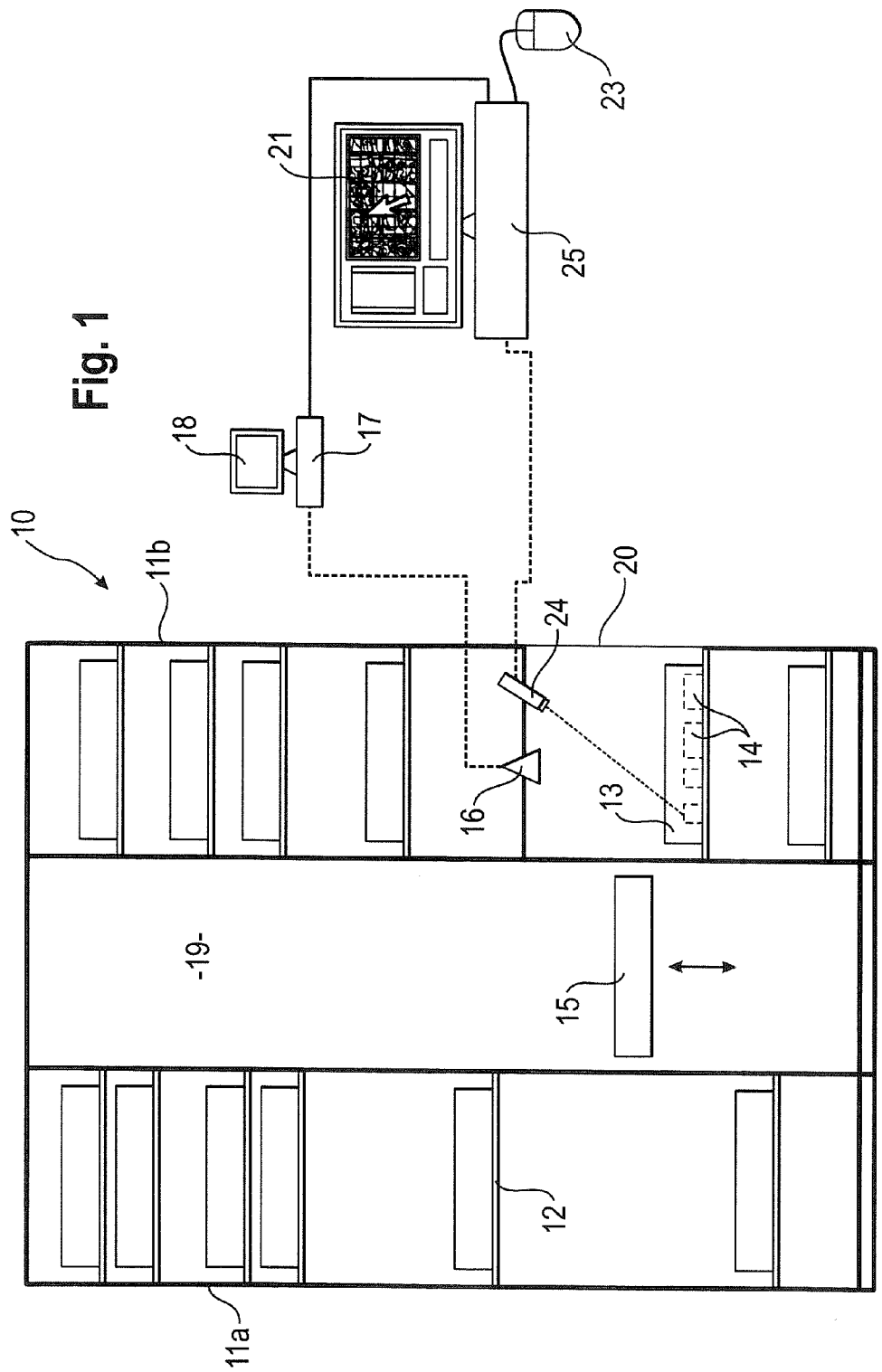

Referring now to FIG. 1 there is illustrated a first embodiment of a storage rack 10 in accordance with the invention comprising two modules 11a, 11b arranged spaced away from each other. Between the modules 11a, 11b a transfer space 19 is provided in which an automatic storage/retrieval device 15 can be automatically traveled.

The modules 11a, 11b, comprise a multitude of supports 12 spaced away from each other in pairs, arranged on facing sidewalls. The supports 12 serve to support trough-shaped containers 13.

Provided at the module 11b is an access opening 20 for storage or removal of the containers 13. Arranged at the top of the access opening 20 is a digital camera 16 for imaging an article 14 held in the container 13. The information acquired by the digital camera 16 is communicated to a computer 17 in which an image capture program is stored. The article 14 held in the container 13 can then be displayed on the display means 21 of the workstation computer 25 without removing the container 13.

By means of the container 13 as visualized by the display means 21 achieved, for example, by a monitor an article 14 scheduled for retrieving can be selected by means of a pointing device. In this example embodiment the pointing device is a computer mouse 23.

After selection of the article 14 to be retrieved the corresponding container 13 is shifted via the transfer space 19 into the access opening 20 by means of an automatic storage/retrieval device 15 devised for automated travel.

As soon as the container 13 is located in the access opening 20 the article 14 previously selected by means of the pointing device 23 can be highlighted by means of an optical highlighting unit 24 to facilitate it being located.

Referring now to FIG. 2 there is illustrated a second embodiment of a storage rack in accordance with the invention. This example embodiment differs from the first embodiment simply by how the pointing device is devised.

In the second embodiment the pointing device is combined with the display means 21 like a touch screen 22. It is thus no longer necessary to make a separate pointing device available.

It is likewise no longer necessary to learn how to use the pointing device. Instead, an article 14 is simply selected by intuitive tactile selection.

The pointing devices 22, 23 as aforementioned are mentioned simply by way of example. It is just as possible to select the article with other pointing devices such as, for example, a trackball or the like.

The invention excels by an advantageous combination of display means 18, 21 and pointer device 22, 23 for intuitive selection of an article 14 to be retrieved now with enhanced efficiency and expediency. Locating the wanted article 14 is facilitated as well.

LIST OF REFERENCE NUMERALS

10 storage rack
11a/b module
12 support
13 container
14 article
15 automatic storage/retrieval device
16 digital camera
17 computer (controller)
18 display means (monitor)
19 transfer space
20 access opening
21 display means (touch screen monitor)
22 touch screen
23 pointer device (computer mouse)
24 optical highlighting unit
25 workstation computer

The invention claimed is:

1. A storage system comprising:
   (a) a storage rack having a plurality of storage positions, each formed by spaced supports and an access opening;
   (b) a plurality of containers sized to be retained on the plurality of supports, each container including at least one article, each container and the access opening sized to pass the container through the access opening;
   (c) a digital camera located to capture a digital image of each of the plurality of containers and the at least one article within each of the plurality of containers;
   (d) a computer connected to the digital camera;
   (e) a display displaying the captured digital image;
   (f) a pointing device cooperating with the display and controllable by a user to select a given article in the displayed captured image;
   (g) a storage/retrieval device operably connected to the storage rack; and
   (h) a controller that controls the storage/retrieval device to move the container retaining the given article between one of the plurality of storage positions and the access opening in response to selection of the given article by a user using the pointing device.

2. The storage system of claim 1, wherein the computer stores the captured digital image.

3. The storage system of claim 1, wherein the pointer is a computer mouse.

4. The storage system of claim 1, wherein the pointer is a touch screen operably connected to the display.

5. The storage system of claim 1, further comprising an optical highlighting unit, wherein the optical highlighting unit highlights the given article after transfer of a corresponding container to the access opening.

6. The storage system of claim 1, wherein the digital camera is located at a top of the access opening.

7. The storage system of claim 1, wherein the digital camera is located proximate the access opening, and the digital image is captured at insertion of a container into the access opening.

8. The storage system of claim 5, wherein the optical highlighting unit includes a steerable laser beam.

9. The storage system of claim 5, wherein the optical highlighting unit includes a light emitting diode.

10. A method of retrieving a stored item, the method comprising:
    (a) capturing a digital image of each of a plurality of containers and at least one article retained in each of the plurality of containers;
    (b) storing the plurality of containers in a storage rack having a corresponding plurality of supports for supporting the plurality of containers and an access opening sized to pass each of the plurality of containers;
    (c) displaying to a user a visual representation of the captured digital image
    (d) providing a user interface allowing a user to select the article from the visual representation;
    (e) retrieving the one of the plurality of containers from the storage rack in response to the user selecting the article; and
    (f) locating the retrieved one of the plurality of storage containers at the access opening.

11. The method of claim 10, further comprising highlighting the selected article in the retrieved container at the access opening of the storage rack.

12. The method of claim 10, wherein the capturing step comprises capturing the digital image of the article with a digital camera.

13. The method of claim 10, further comprising storing the digital image in a computer.

14. The method of claim 10, further comprising selecting the article with a mouse operably connected to a computer and a display displaying the visual representation.

15. The method of claim 10, further comprising selecting the article with a touch screen operably connected to a computer and the visual representation.

16. The method of claim 10, further comprising highlighting the selected article in the container at the access opening.

17. The method of claim 10, further comprising highlighting the selected article in the container at the access opening with a steerable laser beam.

18. The method of claim 10, further comprising highlighting the selected article in the container at the access opening with an LED light.

19. The method of claim 10, wherein the digital image is captured at insertion of a container into the access opening.

* * * * *